(12) United States Patent
Tanimoto et al.

(10) Patent No.: US 8,330,691 B2
(45) Date of Patent: Dec. 11, 2012

(54) DISPLAY PANEL INCLUDING DUMMY PIXELS AND DISPLAY DEVICE HAVING THE PANEL

(75) Inventors: Kazunori Tanimoto, Kizugawa (JP); Junichi Morinaga, Matsusaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 966 days.

(21) Appl. No.: 12/301,132

(22) PCT Filed: Apr. 11, 2007

(86) PCT No.: PCT/JP2007/057941
§ 371 (c)(1),
(2), (4) Date: Nov. 17, 2008

(87) PCT Pub. No.: WO2008/026344

PCT Pub. Date: Mar. 6, 2008

(65) Prior Publication Data
US 2009/0231255 A1    Sep. 17, 2009

(30) Foreign Application Priority Data

Aug. 31, 2006  (JP) .................... 2006-236391

(51) Int. Cl.
G09G 3/36  (2006.01)
(52) U.S. Cl. ....................................................... 345/92
(58) Field of Classification Search .............. 345/87, 345/55, 92; 324/760.01–760.02; 257/48; 349/149, 152
See application file for complete search history.

(56) References Cited

U.S. PATENT DOCUMENTS

| | | | |
|---|---|---|---|
| 6,100,865 A * | 8/2000 | Sasaki .............................. | 345/92 |
| 6,392,719 B2 * | 5/2002 | Kim ................................. | 349/40 |
| 6,624,857 B1 | 9/2003 | Nagata et al. | |
| 6,656,563 B1 | 12/2003 | Leach et al. | |
| 6,801,288 B1 * | 10/2004 | Ashizawa et al. ............. | 349/152 |
| 7,053,649 B1 | 5/2006 | Osada | |
| 7,088,415 B2 * | 8/2006 | Fujita ............................ | 349/143 |
| 7,098,987 B1 * | 8/2006 | Jen et al. ....................... | 349/152 |
| 7,342,563 B2 * | 3/2008 | Eguchi et al. .................. | 345/55 |

(Continued)

FOREIGN PATENT DOCUMENTS

JP    09-080478    3/1997

(Continued)

OTHER PUBLICATIONS

Supplementary EP Search Report mailed Aug. 23, 2010 in corresponding EP application No. 07741377.1.

(Continued)

*Primary Examiner* — Chanh Nguyen
*Assistant Examiner* — Allison Walthall
(74) *Attorney, Agent, or Firm* — Nixon & Vanderhye P.C.

(57) ABSTRACT

A dummy line, which is disposed in a dummy pixel region (2) on the side of a test wiring region (1) and which has a parasitic capacitance effect like that of an adjacent scanning line (Gj) in an effective display region (3), is commonly used as a test switch line (1a). This test switch line (1a) is provided away from a dummy scanning line (DG) by intervals at which the scanning lines (Gj) are provided in the effective display region (3). As a result, it is possible to realize a display panel capable of reducing a frame area while keeping a test circuit region and the dummy pixel region in the frame area, and a display device having the display panel.

16 Claims, 8 Drawing Sheets

U.S. PATENT DOCUMENTS

| | | | |
|---|---|---|---|
| 7,456,647 B2 * | 11/2008 | Jeon et al. | 324/760.02 |
| 2003/0180975 A1 | 9/2003 | Fujita | |
| 2004/0017531 A1 | 1/2004 | Nagata et al. | |
| 2004/0103503 A1 | 6/2004 | Leach et al. | |
| 2004/0105140 A1 | 6/2004 | Fujita | |
| 2004/0108620 A1 | 6/2004 | Leach et al. | |
| 2004/0207018 A1 | 10/2004 | Jang et al. | |
| 2005/0095735 A1 | 5/2005 | Fujita | |
| 2006/0181195 A1 | 8/2006 | Oikawa et al. | |
| 2006/0202923 A1 | 9/2006 | Osada | |
| 2006/0279322 A1 * | 12/2006 | Lai | 324/770 |

FOREIGN PATENT DOCUMENTS

| | | |
|---|---|---|
| JP | 11-149092 | 6/1999 |
| JP | 2004-271587 | 9/2004 |
| WO | 2006/016662 A1 | 2/2006 |

OTHER PUBLICATIONS

International Search Report for PCT/JP2007/057941 mailed May 22, 2007.

* cited by examiner

DISPLAY PANEL INCLUDING DUMMY PIXELS AND DISPLAY DEVICE HAVING THE PANEL

This application is the U.S. national phase of International Application No. PCT/JP2007/057941, filed 11 Apr. 2007, which designated the U.S. and claims priority to Japanese Patent Application No. 2006-236391, filed 31 Aug. 2006, the entire contents of each of which are hereby incorporated by reference.

TECHNICAL FIELD

The present invention relates to a test circuit configuration of a display panel.

BACKGROUND ART

In producing an active matrix liquid crystal display device, after a display panel is assembled such that an active matrix substrate is combined with a counter substrate (CF substrate) and a liquid crystal is injected therebetween, inspecting of faults in produced wiring lines is carried out by an illumination inspection of a display panel before driving circuits of the display panel such as a scanning signal line driving circuit and a signal line driving circuit and a control circuit are mounted.

FIG. 6 illustrates a configuration of a test circuit of a liquid crystal display panel disclosed in Patent Document 1.

The liquid crystal display panel illustrated in FIG. 6 is arranged such that an active matrix substrate 116 is combined with a counter substrate 118, and a liquid crystal is injected therebetween. An effective display region 117 in a region where the active matrix substrate 116 overlaps the counter substrate 118 is usable for providing view images, and light from a backlight (not shown) can pass therethrough. A region except for the effective display region 117 in the region where the active matrix substrate 116 overlaps the counter substrate 118 is light-shielded by the counter substrate 118.

The active matrix substrate 116 includes a blank region that does not overlap the counter substrate 118, around a set of two adjoining edge sides of the liquid crystal display panel. A data signal line driving circuit 120a is mounted in a region of one of the two edge sides of the blank region, and a scanning signal line driving circuit 120b is mounted in a region of the other one of the two edge sides of the blank region.

In the active matrix substrate 116, a test display signal line 121 and test TFTs 126a that are switching elements for data line test are provided opposite to the data signal line driving circuit 120a such that the effective display region 117 is sandwiched therebetween, and a test scanning signal line 122 and test TFTs 126b that are switching elements for scanning line test are provided opposite to the scanning signal line driving circuit 120b such that the effective display region 117 is sandwiched therebetween.

Drains of the test TFTs 126a are respectively connected to data lines 103 and all sources of the test TFTs 126a are connected to the test display signal line 121 in common. Gates of the test TFTs 126a are respectively connected to a red test control signal line 125R, a green test control signal line 125G, and a blue test control signal line 125B, each provided as a control signal line for data line test, such that colors of the data lines 103 connected to the test TFTs 126a respectively correspond to colors of the control signal lines 125R, 125G, and 125B for data line test. Signals are respectively supplied to the control signal lines 125R, 125G, and 125B for data line test from test input terminals (hereinafter referred to as test terminals) 130R, 130G, and 130B while a signal is supplied to the test display signal line 121 from a test terminal 132. The test terminals 130R, 130G, and 130B are provided in the blank region of the active matrix substrate 116.

Further, drains of the test TFTs 126b are respectively connected to scanning lines 102 and all sources of the test TFTs 126b are connected to the test scanning signal line 122 in common. Gates of the test TFTs 126b are connected to a control signal line 124 for scanning line test. A signal is supplied to the control signal line 124 for scanning line test from a test terminal 141, and a signal is supplied to the test scanning signal line 122 from a test terminal 139. Further, storage capacitor lines 104 are provided on the active matrix substrate 116, and a signal is supplied to the storage capacitor lines 104 from a test terminal 143. The test terminals 139, 141, and 143 are provided in the blank region of the active matrix substrate 116.

Moreover, (i) a plurality of terminals p, which are connected to wires to the scanning signal line control circuit 120b or a counter substrate signal input terminal 127 provided in the blank region, and (ii) a plurality of terminals q, which are connected to wires to the data signal line driving circuit 120a, are provided on an edge side of the blank region of the active matrix substrate 116. Furthermore, the test terminal 127 is connected to a common transition section 119.

An illumination inspection of the liquid crystal display panel having the configuration is carried out as follows. Predetermined signals are supplied to the counter substrate signal input terminal 127 and the test terminal 143 so that voltages of a counter electrode and the storage capacitor lines 104 are set. A signal is supplied from the test terminal 141 so as to cause all the test TFTs 126b to be in an ON state, and then a signal is supplied from the test terminal 139 so that all the scanning lines 102 are caused to be in a selection state. Meanwhile, signals are supplied from the test terminals 130R, 130G, and 130B so as to cause the test TFTs 126a, respectively corresponding to colors of the test terminals 130R, 130G, and 130B, to be in an ON state, so that a signal inputted from the test terminal 132 is supplied to the data lines 103 via the test TFTs 126a in the ON state.

As such the illumination inspection is carried out with each of the KGB colors being displayed. This makes it possible to easily carry out a visual detection of not only a bright spot, but also a dark spot that is a leakage defect between a picture element electrode and a data line 103 that should not supply a signal to the picture element electrode (the data line 103 generally supplies a signal to an adjoining picture element), a leakage defect between adjacent picture elements, and a leakage defect between data lines 103 and 103.

Further, Patent Document 2 discloses a configuration in which (i) a test array having TFTs that are connected so as to short-circuit between scanning lines and (ii) a test array having TFTs that are connected so as to short-circuit between signal lines are provided outside a display region, and an inspection is carried out such that all the TFTs of these arrays are caused to be on so that displaying images can be carried out entirely on a panel.

FIG. 7 illustrates a test circuit structurally similar to the aforementioned test circuit.

The test circuit is different from the one of FIG. 6 in that test data signals can be set depending on KGB colors and all switching elements (the after-mentioned test TFTs 201b) that control whether or not the data signals are supplied to data lines are limited such that all the switching elements are caused to be simultaneously ON or OFF.

As illustrated in FIG. 7, in a liquid crystal display panel including the test circuit, a test wiring region 201, an excess region 202, a dummy pixel region 203, and an effective display region 204 are placed in this order in a direction in which data lines extend. The test wiring region 201, the excess region 202, and the dummy pixel region 203 are placed in a frame area (peripheral area) and light-shielded by a counter substrate. The effective display region 204 corresponds to an effective display region 117 in FIG. 6.

The effective display region 204 is arranged such that pixels are placed in regions surrounded by scanning lines Gj (j is an integer) and data lines Si (i is an integer) that are provided perpendicularly to each other. FIG. 8 illustrates an exemplary configuration of the pixels. In FIG. 7, for the sake of convenience in illustration, pixel electrodes of the pixels in the effective display region 204 are represented by P, and pixel electrodes of dummy pixels are represented by DP.

Each pixel includes a TFT (SW) whose gate is connected to a scanning line Gj, and whose source is connected to a data line Si, and a pixel capacitor Cp one of whose electrodes is connected to a drain of the TFT (SW). The other electrode of the pixel capacitor Cp is connected to a common electrode wire that is common to all the pixels. The pixel capacitor Cp is constituted by a liquid crystal capacitor CL and a storage capacitor Cs that is additionally provided as necessary.

In the test wiring region 201, three test data lines (first lines) 201R, 201G, and 201B, each corresponding to R, G, or B color, which are provided in a parallel direction to the scanning lines Gj, a test switch line (a second line) 201a that is provided parallel to the test data lines 201R, 201G, and 201B, and test TFTs (switching elements) 201b are provided. A circuit that is constituted by the test data lines 201R, 201G, and 201B, the test switch line 201a, and the test TFTs 201b is a first circuit. The test switch line 201a is singularly placed nearer to the effective display region 204 than the test data lines 201R, 201G, and 201B, and a common control signal for electrical connection and disconnection is supplied to the test TFTs 201b via the test switch line 201a. The test TFTs 201b are respectively provided for the data lines Si so as to be connected to the test data lines 201R, 201G, and 201B such that the test data lines 201R, 201G, and 2013 respectively correspond to colors of the data lines Si. The test TFTs 201b achieve electrical connection and disconnection between the data lines Si and the test data line 201R, 201G, and 201B. Further, gates of the test TFTs 201b are connected to the test switch line 201a.

The excess region 202 is a region to which numbering is carried out for forming a pattern 202a so that the pattern 202a indicates where each line per pixel width along the data lines Si is located from an end.

In the dummy pixel region 203, pixels are provided structurally equivalent to the pixels in the effective display region 204. The pixels in the dummy pixel region 203 may be provided in a plurality of rows, and gates of TFTs (SW) of pixels provided nearest to the effective display region 204 are connected to a dummy scanning line DG. The dummy scanning line DG is provided so as to have an effect on pixels in the effective display region 204, which pixels are provided nearest to the frame area, in a similar manner that an adjacent scanning line Gj has a parasitic capacitance effect on other pixels in the effective display region 204. From the same viewpoint, the entire dummy pixels are arranged in a similar manner to the pixels in the effective display region 204 so that all the pixels in the effective display region 204 are affected by surroundings as equally as possible. From this reason, even in the dummy pixel region 203, a dummy line DL that causes the same parasitic capacitance effect as the adjacent scanning lines Gj is provided close to the excess region 202.

In the liquid crystal display panel having the configuration in FIG. 7, when an illumination inspection is carried out, a selection voltage is applied to all the scanning lines Gj and the dummy scanning line DG so that the scanning lines Gj and the dummy scanning line DG are in a selection state, and all the test TFTs 201b are caused to be in an ON state by the test switch line 201a. Then, signals respectively supplied to the test data lines 201R, 201G, and 201B are written to a respective of the pixels via the data lines Si.

[Patent Document 1]
Japanese Unexamined Patent Publication, Tokukai, No. 2005-122209 (published on May 12, 2005)

[Patent Document 2]
Japanese Unexamined Patent Publication, Tokukaihei, No. 1'-149092 (published on Jun. 2, 1999)

[Patent Document 3]
Japanese Unexamined Patent Publication, Tokukaihei, No. 9-80478 (published on Mar. 28, 1997)

DISCLOSURE OF INVENTION

The liquid crystal display panel disclosed in Patent Document and the liquid crystal display panel of FIG. 7 are arranged such that they can be assembled without removing a region of a substrate in which region a test circuit is provided, after the test circuit is formed. This can skip a step of removing the region of the substrate in which region the test circuit is provided. As a result, it is possible to simplify production processes of a liquid crystal display panel.

In a device, such as a mobile device including a liquid crystal display panel, which is required to be miniaturized, in order that the device is to be further miniaturized, it is necessary to further reduce a frame area (peripheral area) of the liquid crystal display panel. In this regard, in order that the frame area is further reduced while the region of the substrate in which region the test circuit is provided is not removed so that the simplification of the production processes is maintained, it is effective to reduce more a circuit size in the frame area.

However, in a case where the dummy pixel region 203 is provided as illustrated in FIG. 7 and the region is necessary for the liquid crystal display panel, the dummy pixels are as large as the pixels in the effective display region 204. In such a case, it is required to reduce the frame area such that an area other than the dummy pixel region 203 is reduced. However, it is especially difficult to reduce the frame area in such the manner.

The present invention is accomplished in view of the above problems. An object of the present invention is to realize a display panel and a display device including the display panel, each capable of reducing a frame area while maintaining a test circuit region and a dummy pixel region being in the frame area.

In order to achieve the above object, an active matrix display panel of the present invention includes a first circuit outside an effective display region that is usable for providing view images, and the first circuit includes: at least one first line via each of which a predetermined signal is supplied to a corresponding data line; switching elements, respectively provided for data lines, which achieve electrical connection and disconnection between the data lines and said at least one first line; and a single second line, provided parallel to scanning lines, via which a common control signal for the electrical connection and disconnection is supplied to the switching elements. The active matrix display panel further includes dummy pixels which are structurally equivalent to pixels provided in the effective display region, and which are provided so as to be outside the effective display region and so as to be closer to the second line. In the display panel, the second line is provided away from a scanning line of dummy pixels that are provided farthest from the effective display region, by intervals at which the scanning lines are provided in the effective display region, in a direction away from the effective display region.

According to the invention, the second line is provided away from a scanning line of dummy pixels that are provided farthest from the effective display region, by intervals at which the scanning lines are provided in the effective display region, in a direction away from the effective display region. On this account, there is no excess region that is conventionally provided between the second line and a dummy pixel region. Consequently, this makes it possible to reduce a frame area by just a size of the excess region. The first circuit can be, for example, a test circuit used for an illumination inspection, but may be other circuits.

This brings an advantageous effect to realize a display panel that is capable of reducing a frame area while maintaining a test circuit region and a dummy pixel region in the frame area.

In order to achieve the above object, an active matrix display panel of the present invention includes a first circuit outside an effective display region that is usable for providing view images, and the first circuit includes: at least one first line via each of which a predetermined signal is supplied to a corresponding data line; switching elements, respectively provided for data lines, which achieve electrical connection and disconnection between the data lines and said at least one first line; and a single second line, provided parallel to scanning lines, via which a common control signal for the electrical connection and disconnection is supplied to the switching elements. The active matrix display panel further includes: dummy pixels which are structurally equivalent to pixels provided in the effective display region, and which are provided so as to be outside the effective display region, and so as to be closer to the second line. In the display panel, the second line is also used as a scanning line of dummy pixels that are provided farthest from the effective display region, and the switching elements are also used as active elements that achieve electrical connection and disconnection between the scanning line of the dummy pixels that are provided farthest from the effective display region and the data lines.

According to the invention, the second line is also used as a scanning line of dummy pixels that are provided farthest away from the effective display region, and the switching elements are also used as active elements that achieve electrical connection and disconnection between the scanning line of the dummy pixels that are provided farthest from the effective display region and the data lines. On this account, an excess region that is conventionally provided between the second line and a dummy pixel region is not provided, and a region for forming either ones of the switching elements and the active elements is not required. This makes it possible to reduce a frame area by just a size of the excess region and the region for the either ones of the elements, which is not required to be provided. The first circuit can be, for example, a test circuit used for an illumination inspection, but may be other circuits.

This brings an advantageous effect to realize a display panel that is capable of reducing a frame area while maintaining a test circuit region and a dummy pixel region in the frame area.

In order to achieve the above object, the display panel of the present invention further includes a secondary first circuit outside the effective display region that is usable for providing view images, and the secondary first circuit includes at least one secondary first line via each of which a predetermined signal is supplied to a corresponding scanning line; second switching elements, respectively provided for scanning lines, which achieve electrical connection and disconnection between the scanning lines and said at least one secondary first line; and a single secondary second line, provided parallel to data lines, via which a common control signal for the electrical connection and disconnection is supplied to the second switching elements. The active matrix display panel further includes second dummy pixels which are structurally equivalent to pixels provided in the effective display region, and which are provided so as to be outside the effective display region and so as to be closer to the secondary second line. In the display panel, the secondary second line is provided away from a data line of second dummy pixels that are provided farthest from the effective display region, by intervals at which the data lines are provided in the effective display region, in a direction away from the effective display region.

According to the invention, the secondary second line is provided away from a data line of second dummy pixels that are provided farthest from the effective display region, by intervals at which the data lines are provided in the effective display region, in a direction away from the effective display region. On this account, there is no excess region that is conventionally provided between the secondary second line and a second dummy pixel region. The secondary first circuit can be, for example, a test circuit used for an illumination inspection, but may be other circuits.

Consequently, this brings an advantageous effect to realize a display panel that is capable of reducing a frame area while maintaining a test circuit region and a dummy pixel region in the frame area.

In order to achieve the above object, an active matrix display panel of the present invention includes a first circuit outside an effective display region that is usable for providing view images, and the first circuit includes: at least one first line via each of which a predetermined signal is supplied to a corresponding scanning line; switching elements, respectively provided for scanning lines, which achieve electrical connection and disconnection between the scanning lines and said at least one first line; and a single second line, provided parallel to data lines, via which a common control signal for the electrical connection and disconnection is supplied to the switching elements. The active matrix display panel further includes dummy pixels which are structurally equivalent to pixels provided in the effective display region, and which are provided so as to be outside the effective display region and so as to be closer to the second line. In the display panel, the second line is provided away from a data line of dummy pixels that are provided farthest from the effective display region, by intervals at which the data lines are provided in the effective display region, in a direction away from the effective display region.

According to the invention, the second line is provided away from a data line of dummy pixels that are provided farthest from the effective display region, by intervals at which the data lines are provided in the effective display region, in a direction away from the effective display region. On this account, there is no excess region that is conventionally provided between the second line and a dummy pixel region. This makes it possible to reduce a frame area by just a size of the excess region. The first circuit can be a test circuit used for an illumination inspection, but may be other circuits.

Consequently, this configuration brings an advantageous effect to realize a display panel that is capable of reducing a frame area while maintaining a test circuit region and a dummy pixel region in the frame area.

In order to achieve the above object, in the display panel of the present invention, a pattern indicative of a position on the display panel is formed in a region where the dummy pixels are provided.

With the invention, even if there is no excess region provided unlike the conventional configuration, it is advantageously possible to find out a position on the display panel.

In order to achieve the above object, in the display panel of the present invention, a voltage, applied to the second line, which causes the switching elements to be on is equivalent to a selection voltage that is applied to the scanning lines in the effective display region.

With the invention, it is advantageously possible that a parasitic capacitance effect that is caused by the second line with respect to the dummy pixels is close to a parasitic capacitance effect that is caused by an adjacent scanning line with respect to pixels in the effective display region.

In order to achieve that above object, in the display panel of the present invention, while the switching elements are caused to be on, an illumination inspection is carried out such that the predetermined signal is supplied to the corresponding data line via each of said at least one first line.

With the invention, it is possible to advantageously reduce a frame area, with a first circuit being provided as an illumination inspection circuit.

In order to achieve the above object, in the display panel of the present invention, while the display panel is being normally used, a voltage that causes the switching elements to be off is supplied to the second line.

According to the invention, while the display panel is being normally used, the first line(s) and the data lines are isolated by the switching elements caused to be off. This brings an advantageous effect that potentials of the data lines is not affected by the first line(s) in normal use.

In order to achieve the above object, in the display panel of the present invention, while the display panel is being normally used, (i) a voltage that causes the switching elements to be off is applied to the second line, and (ii) a voltage that causes the second switching elements to be off is applied to the secondary second line.

According to the invention, while the display panel is being normally used, (i) the first line(s) and the data lines are isolated by the switching elements caused to be off, and (ii) the secondary first line(s) and the scanning lines are isolated by the second switching element caused to be off. This brings an advantageous effect that, in normal use, potentials of the data lines is not affected by the first line(s), and potentials of the scanning lines is not affected by the secondary first line(s).

In order to achieve the above object, the display panel of the present invention, while the display panel is being normally used, a voltage, applied to the second line, which causes the switching elements to be off is equivalent to a non selection voltage that is applied to the scanning lines in the effective display region.

With the invention, it is advantageously possible that, while the display panel is being normally used, a parasitic capacitance effect that is caused by the second line with respect to the dummy pixels is close to a parasitic capacitance effect that is caused by an adjacent scanning line to pixels in the effective display region.

In order to achieve the above object, in the display panel of the present invention, a display driver is provided in a part of a frame area in which part the first circuit is not provided, the frame area being provided outside the effective display region.

According to the invention, a part of a frame area in which part the first circuit is provided is different from a display region in which a display driver is to be provided. This makes it possible to advantageously reduce each of the parts in the frame area.

In order to achieve the above object, in the display panel of the present invention, a display driver is provided in a part of a frame area in which part neither the first circuit nor the secondary first circuit is provided, the frame area being provided outside the effective display region.

According to the invention, parts of a frame area in which parts the first circuit and the second circuit are provided are different from a display region in which a display driver is to be provided. This makes it possible to advantageously reduce each of the parts in the frame area.

In order to achieve the above object, the display panel of the present invention is a liquid crystal display panel.

With the invention, it is possible to advantageously reduce a frame area in a liquid crystal display panel.

In order to achieve the above object, a display device of the present invention includes the display panel.

With the invention, it is possible to advantageously realize a display device in which a frame area is reduced.

Additional objects, features, and strengths of the present invention will be made clear by the description below. Further, the advantages of the present invention will be evident from the following explanation in reference to the drawings.

EXPLANATION OF REFERENTIAL NUMERALS 1a, 21a, 31a, 36a: Test Switch Line (Second line)
1b, 21b, 31b, 36b: Test TFT (Switching Element)

1R, 1G, 1B, 21R, 21G, 21B, 31R, 31G, 31B: Test Data Line (First line)
2a, 22a, 32a: Pattern
3: Effective Display Region
36c: Test Scanning Line (First line)
Gj: Scanning Line
Si: Data Line
SW: TFT (Active Element)

BEST MODE FOR CARRYING OUT THE INVENTION

Embodiment 1

Figure 8:
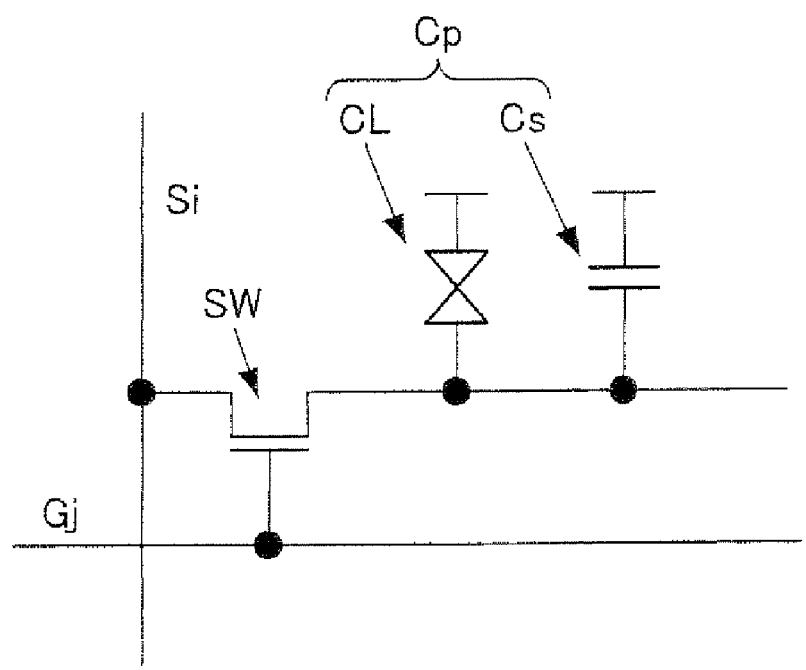
FIG. 8 is an equivalent circuit schematic illustrating a pixel configuration.

One embodiment of the present invention is explained below with reference to FIGS. 1, 2, and 8.

Figure 1:
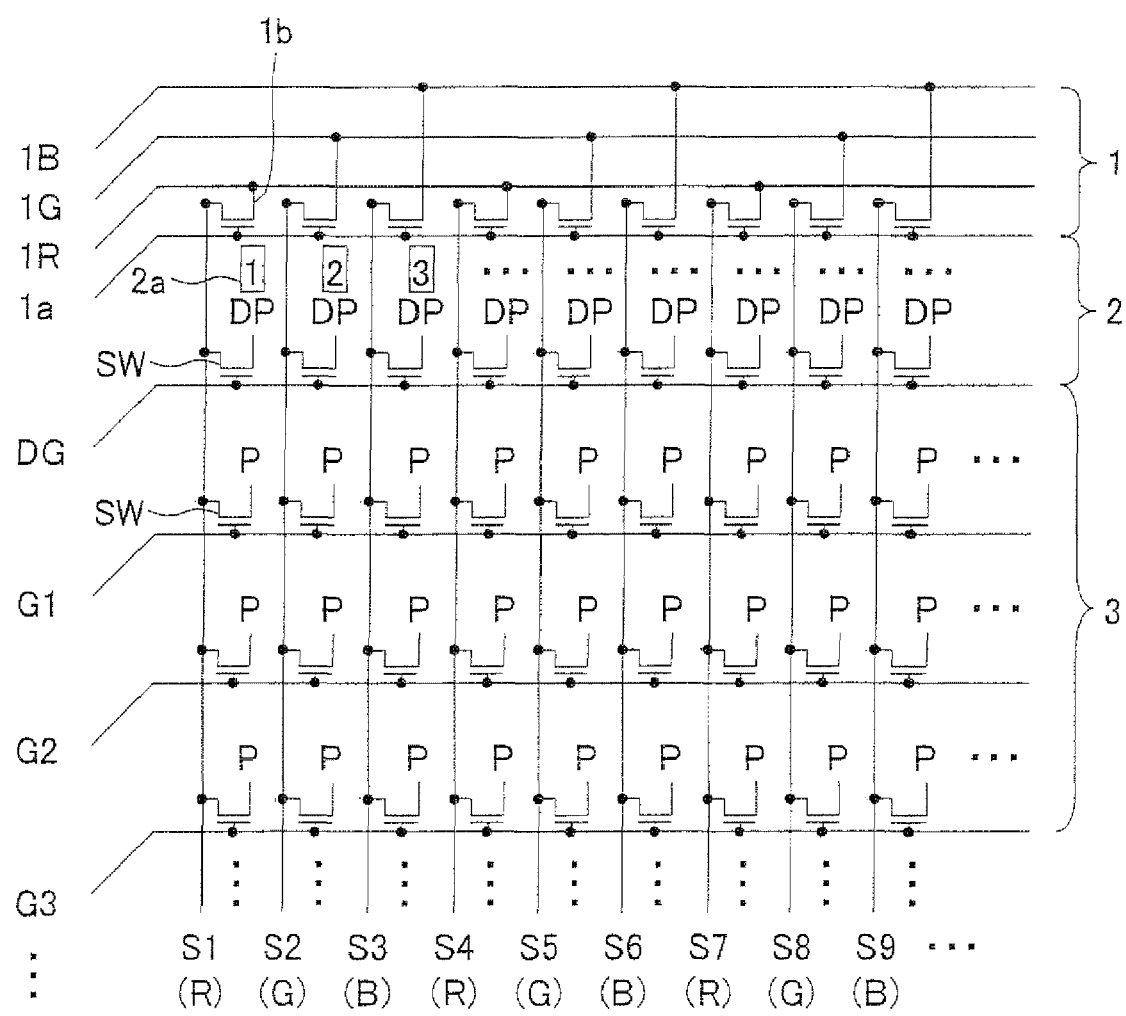
FIG. 1 is a block diagram illustrating a configuration of essential parts of a display panel according to a first embodiment of the present invention.

FIG. 1 illustrates a circuit configuration around a boundary between a frame area (peripheral area) and an effective display region, in an active matrix liquid crystal display panel (display panel) according to the present embodiment.

In the liquid crystal display panel, a test wiring region 1, a dummy pixel region 2, and an effective display region 3 are placed in this order in a direction in which data lines extend. The test wiring region 1 and the dummy pixel region 2 are placed in the frame area and light-shielded by a counter substrate.

The effective display region 3 is usable for providing view images and arranged such that pixels are respectively provided in regions surrounded by scanning liens GJ (j is an integer) and data lines Si (i is integer) that are provided perpendicularly to each other. An exemplary configuration of the pixels is the same as the one illustrated in FIG. 8. In FIG. 1, for the sake of convenience in illustration, pixel electrodes of the pixels in the effective display region 3 are represented by P, and pixel electrodes in dummy pixels are represented by DP.

In the test wiring region 1, three test data lines (first lines) 1R, 1G, and 1B are provided parallel to the scanning lines Gj, respectively corresponding to K, G, and B colors, a test switch line (a second line) 1a is provided parallel to the test data lines 1R, 1G, and 1B, and test TFTs (switching elements) 1b are provided. A circuit that is constituted by the test data lines 1R, 1G, and 1B, and the test switch line 1a, and the test TFTs 1b is a first circuit. The test switch line 1a is singularly provided nearer to the effective display region 3 than the test data lines 1R, 1G, and 1B, and supplies, to the test TFTs 1b, a common control signal for electrical connection and disconnection. The test TFTs 1b are respectively provided for the data lines Si so as to be connected to the test data lines 1R, 1G, and 1B such that the test data lines 1R, 1G, are 1B respectively correspond to colors of the data lines Si. The test TFTs 1b control to achieve electrical connection and disconnection between the data lines Si and the test data lines 1R, 1G, and 1B. Gates of the test TFTs 1b are connected to the test switch 1a.

In the dummy pixel region 2, pixels are provided structurally equivalent to the pixels provided in the effective display region 3. The pixels in the dummy pixel region 2 may be provided in a plurality of rows, and gates of TFTs (SW) of pixels provided nearest to the effective display region 3 are connected to a dummy scanning line DG. The dummy scanning line DG is provided so as to have an effect on pixels in the effective display region 3, which pixels are provided nearest to the frame area, in a similar manner that an adjacent scanning line Gj has a parasitic capacitance effect on other pixels in the effective display region 3. That is, the dummy scanning line DG is provided away from a scanning line G1 by intervals at which the scanning lines Gj are provided in the effective display region 3. From the same viewpoint, whole dummy pixels are provided structurally equivalent to the pixels in the effective display region 3 so that all the pixels in the effective display region 3 are affected by surroundings as equally as possible.

On this account, it is preferable that, in the dummy pixel region 2, a dummy line having a parasitic capacitance effect equivalent to that of the adjacent scanning line Gj be also provided close to the test wiring region 1. However, in the present embodiment, the test switch line 1a is also used as the dummy line. The test switch 1a is provided away from the dummy scanning line DG by intervals at which the scanning lines Gj are provided in the effective display region 3. Considering the case where the dummy pixels may be provided in a plurality of rows, the test switch line 1a is provided away from a scanning line of dummy pixels that are provided farthest from the effective display region 4, by intervals at which the scanning lines Gj are provided in the effective display region 3, in a direction away from the effective display region 3. Accordingly, in the present embodiment, there is no region corresponding to the excess region 202 that is provided in the conventional liquid panel illustrated in FIG. 7.

Furthermore, numbering is carried out with respect to the dummy pixel region 2 for forming a pattern 2a indicative of where each line per pixel width along the data lines Si is located from an end. The pattern 2a is not limited to a number, but can be a character, a mark, or the like provided that the pattern can specify a position. Further, the pattern 2a can be formed, for example, by a gate metal.

In the liquid crystal display panel in FIG. 1, when an illumination inspection is carried out, selection voltages are applied to all the scanning lines Gj and the dummy scanning line DG so that the pixels in the effective display region 3 and the dummy pixels are entirely caused to be in a selection state, and all the test TFTs 1b are caused to switch to an ON state by the test switch line 1a. Then, signals respectively supplied to the test data lines 1R, 1G, and 1B are written to a respective of the pixels via the data lines Si. At this moment, if a selection voltage applied to the test switch line 1a is equivalent to the selection voltage applied to the scanning lines Gj, a parasitic capacitance effect caused by the test switch line 1a with respect to the dummy pixels can be close to the parasitic capacitance effect caused by an adjacent scanning line Gj with respect to pixels in the effective display region 3.

Further, while the liquid crystal display panel is being normally used, a voltage that causes the test TFTs 1b to be in an OFF state is applied to the test switch line 1a. If the voltage is equivalent to a non selection voltage that is applied to the scanning lines Gj, a parasitic capacitance effect caused by the test switch line 1a with respect to the dummy pixels can be close to a parasitic capacitance effect caused by an adjacent scanning line Gj with respect to pixels in the effective display region 3.

The dummy pixels, in normal use, may be driven by a signal supplied to the dummy scanning line DG, which signal is supplied independently from a signal supplied to the scanning lines Gj, or may be driven in such a manner that the dummy scanning line DG is provided as a target to be sequentially scanned as well as the scanning lines Gj. Further, the dummy scanning line DG can be floating.

As such, in the present embodiment, the test switch line 1a is also used as a dummy line corresponding to an adjacent scanning line and causes a parasitic capacitance effect on the dummy pixels, thereby eliminating an excess region that is conventionally provided in a frame area, with the result that the frame area can be reduced in a direction of the data lines Si. For example, in a liquid crystal display panel such as a QVGA panel for a mobile device, it is possible to attain a largely reduced width such that a width of approximately one dot or one line is 150 μm to 200 μm in the direction of the data lines Si.

In a case where the dummy pixels are provided in a plurality of rows, the test switch line 1a is also used as a dummy line, corresponding to an adjacent scanning line, of dummy pixels provided in a row nearest to the test wiring region 1. Further, in the example, three test lines are provides so that the three test lines respectively correspond to R, G, and B colors. However, the number of the test lines is not limited to this, and an arbitrary number of the test lines may be provided.

Figure 2:
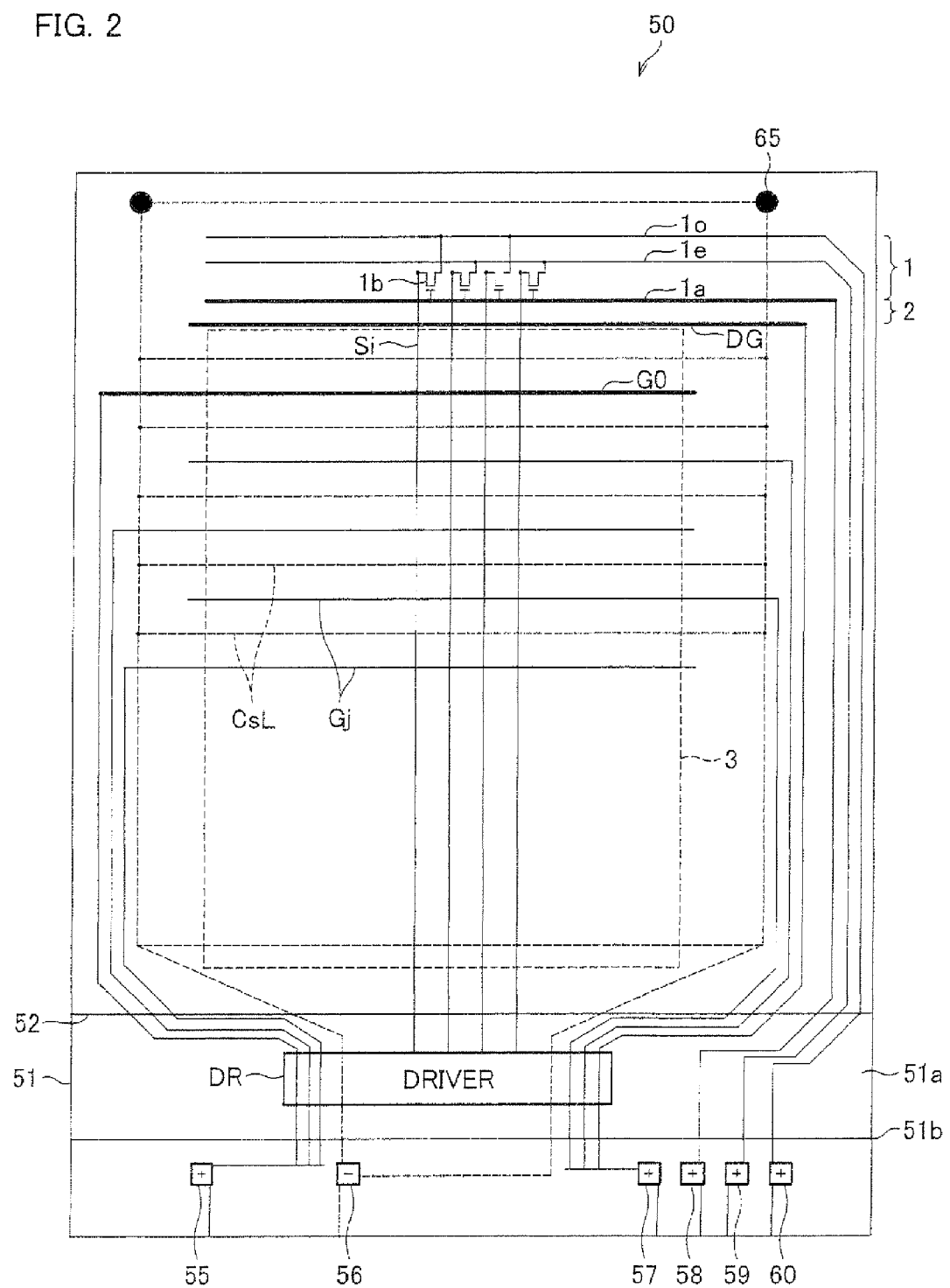
FIG. 2 is a plane view illustrating a configuration of a display panel to which the display panel of FIG. 1 is applied.

FIG. 2 illustrates a configuration of a liquid crystal display panel 50 to which the configuration of FIG. 1 is applied.

The liquid crystal display panel 50 is arranged such that an active matrix substrate 51 is combined with a counter substrate 52, and a liquid crystal is injected therebetween.

In a region (equal to an entire region of the counter substrate 52) where the active matrix substrate 51 and the counter substrate 52 overlap each other, a region in a center part, which is surrounded by dash lines in FIG. 2, is an effective display region 3 and light-shielded by the counter substrate 52.

In the active matrix substrate 51, a blank region 51a that does not overlap the counter substrate 52 is provided outward with respect to an edge side, adjacent to the overlapping region, of the blank region 51a. The blank region 51a includes (i) a region in which a driver DR integrally including a scanning line driver and a data line driver is to be provided, and (ii) a region in which terminals 55 through 60 to which various test signals are supplied in an illumination inspection are to be provided. The region in which the driver DR is to be provided occupies about a half of the blank region 51a that is close to the counter substrate 52. The region in which the terminals 55 through 60 are to be provided occupies the other half of the blank region 51a. A boundary between the region in which the driver DR is to be provided and the region in which the terminals 55 through 60 are to be provided is a cut off line 51b.

Until the illumination inspection is carried out after the active matrix substrate 51 and the counter substrate 52 are combined with each other, the blank region 51a includes both of the region where the driver DR is to be provided and the region where the terminals 55 through 60 are to be provided. After the illumination inspection is completed, the blank region 51a is cut off at the cut off line 51b such that only the region where the driver DR is to be provided remains, and the driver DR is mounted thereon. A region that remains after the blank region 51a has been cut off at the cut off line 51b, except for the effective display region 3, is a frame area in a liquid crystal display devise (a display device) including the liquid crystal display panel 50.

In the liquid crystal display panel 50, scanning lines Gj of even numbers are provided in the effective display region 3 such that the scanning lines Gj of even numbers are routed from the terminal 55, on the active matrix substrate 50, through a region on a left outside of the effective display region 3 in FIG. 2. Meanwhile, scanning lines Gj of odd numbers are provided in the effective display region 3 such that the scanning lines Gj of odd numbers are routed from the terminal 57, on the active matrix substrate 51, through a region on a right outside of the effective display region 3 in FIG. 2 (in FIG. 2, an uppermost scanning line Gj is temporarily regarded as zeroth). In this case, the lines of the scanning lines Gj thus routed from the terminal 55 and the lines of the scanning lines Gj thus routed from the terminal 57 are respectively provided so as to pass through a part to which a connecting terminal of the driver DR is connected when the driver DR is mounted. This allows the lines of the scanning lines Gj thus routed to be commonly used for an illumination inspection and a normal use, thereby resulting in that a circuit region in the liquid crystal display panel 5 can be reduced by just that much.

Further, a region placed opposite to the blank region 51a such that they sandwich the effective display region 3 includes a test wiring region 1 and a dummy pixel region 2. In the region, a test data line 1o for data lines Si of odd numbers and a test data line 1e for data lines Si of even numbers are provided as test data lines of the test wiring region 1 (in FIG. 2, a data line Si on a left end is temporarily regarded as first). Test TFTs 1b are respectively provided between the test data line 1o and a respective of the data lines Si of odd numbers, and between the test data line 1e and a respective of the data lines of even numbers. Gates of the test TFTs 1b are connected to a test switch line 1a.

Moreover, the test switch line 1a, the test data line 1e, and the test data line 1o are routed, on the active matrix substrate 51, through the region on the right outside of the effective display region 3, and respectively connected to the terminals 58, 59, and 60. When an illumination inspection is carried out, a test switch signal (a signal that causes the test TFTs 1b to switch between ON/OFF) is supplied to the terminal 58, a first data line test signal (a test signal for testing the data lines Si of odd numbers) is supplied to the terminal 59, and a second data line test signal (a test signal for testing the data lines Si of even numbers) is supplied to the terminal 60. Each of the signals is supplied via a probe of a test machine. As such, the test data line 1o for the data lines Si of odd numbers and the test data line 1e for the data lines Si of even numbers are provided as the test data lines in the test wiring region 1, thereby resulting in that leakage between adjoining data lines Si can be detected.

Furthermore, a dummy scanning line DG in the dummy pixel region 2 is routed, on the active matrix substrate 51, through the region on the right outside of the effective display region 3. The line of the dummy scanning line DG thus routed also passes through the part on which the driver DR is to be mounted, similarly to the lines of the scanning lines Gj of odd numbers thus routed.

Further, on the active matrix substrate 51, a wiring line from the terminal 56 is provided so as to surround the effective display region 3, and wiring lines from the surrounding wiring line is provided so as to cross the effective display region 3, parallel to the scanning lines Gj. A common potential is supplied to the wiring lines from the terminal 56. The wiring lines that cross the effective display region 3, parallel to the scanning lines Gj, are storage capacitor lines CsL. Further, common transition sections 65, which are illustrated as filled circles, are provided, on the surrounding wiring line, in the vicinity of a region where a test circuit is provided, and the common potential is supplied to a counter electrode of the counter substrate 52 via the common transition sections 65. The wiring line thus routed from the terminal 56 is provided so as to pass through the part on which the driver DR is to be mounted, similarly to the lines routed from the terminals 5D and 57. When the illumination inspection is carried out, the common potential is supplied to the terminal 56 via the probe of the test machine.

In the example of FIG. 2, the driver is provided for only one side of the liquid crystal display panel. However, the arrangement is not limited to this, and drivers can be provided on two or more sides.

Embodiment 2

Another embodiment of the present invention is explained below with reference to FIGS. 3, 4, and 8.

Figure 3:
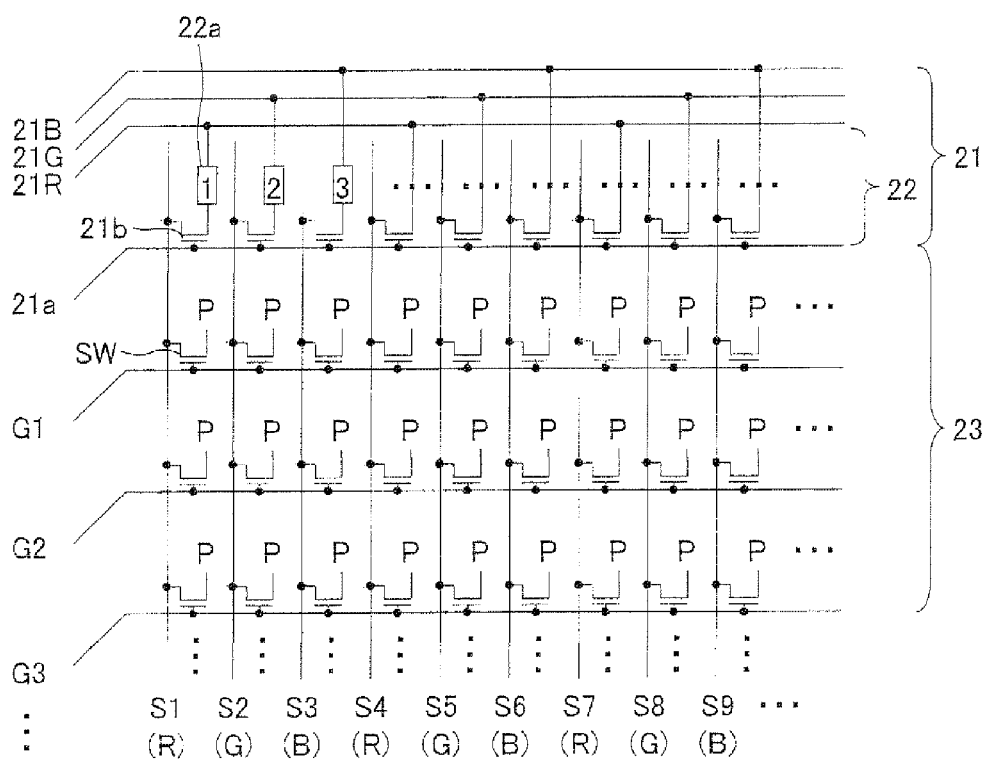
FIG. 3 is a block diagram illustrating a configuration of essential parts of a display panel according to a second embodiment of the present invention.

FIG. 3 illustrates a circuit configuration around a boundary between a frame area and an effective display region, in an active matrix liquid crystal display panel (a display panel) of the present embodiment.

In the liquid crystal display panel, a test wiring region 21 and an effective display region 23 are placed in this order in a direction in which data lines extend. A part of the test wiring region 21, close to the effective display region, is a dummy pixel region 22. The test wiring region 21 is placed in the frame area and light-shielded by a counter substrate.

The effective display region 23 is usable for providing view images, and arranged such that pixels are respectively provided in regions surrounded by scanning lines Gj (j is an integer) and data lines Si (i is an integer) that are provided perpendicularly to each other. An exemplary configuration of the pixels is the same as the one illustrated in FIG. 8. In FIG. 3, for the sake of convenience in illustration, pixel electrodes of the pixels in the effective display region 23 are represented by P, and pixel electrodes in dummy pixels are not illustrated.

In the test wiring region 21, three test data lines (first lines) 211R, 21G, and 21B are provided parallel to scanning lines Gj, respectively corresponding to R, G, and B colors, a test switch line (a second line) 21a is provided parallel to the test data lines 21R, 21G, and 21B, and test TFTs (switching elements) 21b are provided. A circuit that is constituted by the test data lines 21R, 21G, and 21B, the test switch line 21a, and the test TFTs 21b is a first circuit. The test switch line 21a is singularly provided nearer to the effective display region 23 than the test data lines 21R, 21G, and 21B, and supplies, to the test TFTs 21b, a common control signal for electrical connection and disconnection.

The test TFTs 21b are respectively provided for the data lines Si so as to be connected to the test data lines 21R, 21G, and 21B such that the test data lines 21 R, 21G, and 21 B respectively correspond to colors of the data lines Si. The test TFTs 21b control to achieve electrical connection and disconnection between the data lines Si and the test data lines 21R, 21G, and 21B. Gates of the test TFTs 21b are connected to the test switch line 21a. Further, the test TFTs 21b are also used as TFTs (SW) that are active elements that achieve, in dummy pixels, electrical connection to and disconnection from the data lines Si, and the test TFTs 21b are also connected to dummy pixel electrode (not shown). The test switch line 21a is also used as a dummy scanning line DG for the TFTs (SW) of the dummy pixels, and provided away from a scanning line G1 by intervals at which the scanning lines Gj are provided in the effective display region 23. As such, a part nearer to the effective display region 23 than the test data lines 21R, 21G, and 21B in the test wiring region 21 is the dummy pixel region 22 in which the test TFTs 21b are provided so as to respectively correspond to the dummy pixels.

In a case where the dummy pixels are provided in a plurality of rows in the dummy pixels region, dummy pixels provided in a row farthest from the effective display region 23 are arranged as described above, and dummy pixels in other rows are provided structurally equivalent to those in Embodiment 1. Considering the case where the dummy pixels are provided in a plurality of rows as such, the test switch line 21a is also used as a scanning line of dummy pixels that are provided farthest from the effective display region 23, and the test TFTs 21b are also used as active elements of the dummy pixels that are provided farthest from the effective display region 23. From this reason, it is apparent that the test switch line 21a is provided away from a scanning line of pixels that are inwardly adjacent to the test switch line 21a, by intervals at which the scanning lines Gj are provided in the effective display region 23.

Figure 7:
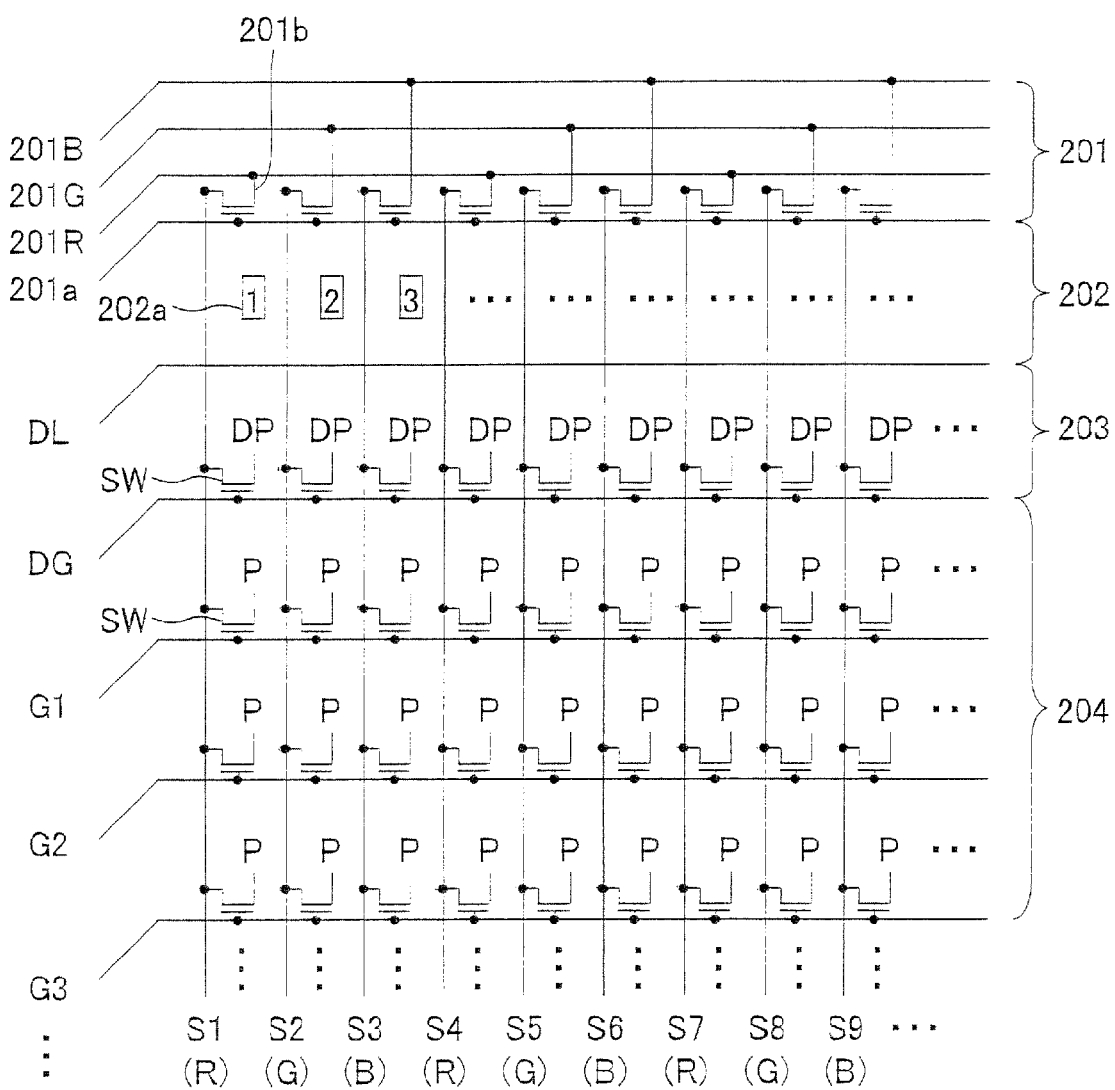
FIG. 7 is a block diagram illustrating a configuration of essential parts of a display panel of a second conventional technology.

As such, in the present embodiment, there is no region corresponding to the excess region 202 that is provided in the conventional liquid crystal display panel illustrated in FIG. 7. Further, a region for forming either one of the test TFTs 201b of the test wiring region 201 and the TFTs (SW) of the dummy pixel region 203 is not required.

Moreover, numbering is carried out with respect to the dummy pixel region 22 for forming a pattern 22a indicative of where each line per pixel width along the data lines Si is located from an end. The pattern 22a is not limited to a number, but can be a character, a mark, or the like provided that the pattern can specify a position. Furthermore, the pattern 22a can be formed, for example, by a gate metal.

In the liquid crystal display panel in FIG. 3, when an illumination inspection is carried out, selection voltages are applied to all the scanning lines Gj and the test switch line 21a so that the pixels in the effective display region 23 and the dummy pixels are entirely caused to be in a selection state. Then, signals respectively supplied to the test data lines 21R, 21G, and 21B are written to a respective of the pixels via the data lines Si. At this moment, if the selection voltage applied to the test switch line 21a is equivalent to the selection voltage applied to the scanning lines Gj, a parasitic capacitance effect caused by the test switch line 21a with respect to pixels connected to the scanning lines G1 can be close to a parasitic capacitance effect caused by an adjacent scanning line Gj with respect to other pixels in the effective display region 3.

While the liquid crystal display panel is being normally used, a voltage that causes the test TFTs 21b to be in an OFF state is applied to the test switch line 21a. If the voltage is equivalent to a non selection voltage applied to the scanning lines Gj, a parasitic capacitance effect caused by the test switch line 21a with respect to pixels connected to the scanning line G1 can be close to a parasitic capacitance effect caused by an adjacent scanning line Gj with respect to other pixels in the effective display region 3.

As such, in the present embodiment, the test TFTs 21b are also used as the TFTs (SW) of the dummy pixels, and the test switch line 21a is also used as the dummy scanning line DG for the TFTs (SW) of the dummy pixels. This makes it possible to eliminate an excess region that is conventionally provided in a frame area, and to reduce the frame area in a direction of the data lines Si, since a TFT forming region can be reduced by one line.

In the examples the three test data lines are provided so as to correspond to R, G, B colors, but the number of the test data lines is not limited to this, and an arbitrary number of the test data lines may be provided.

Figure 4:
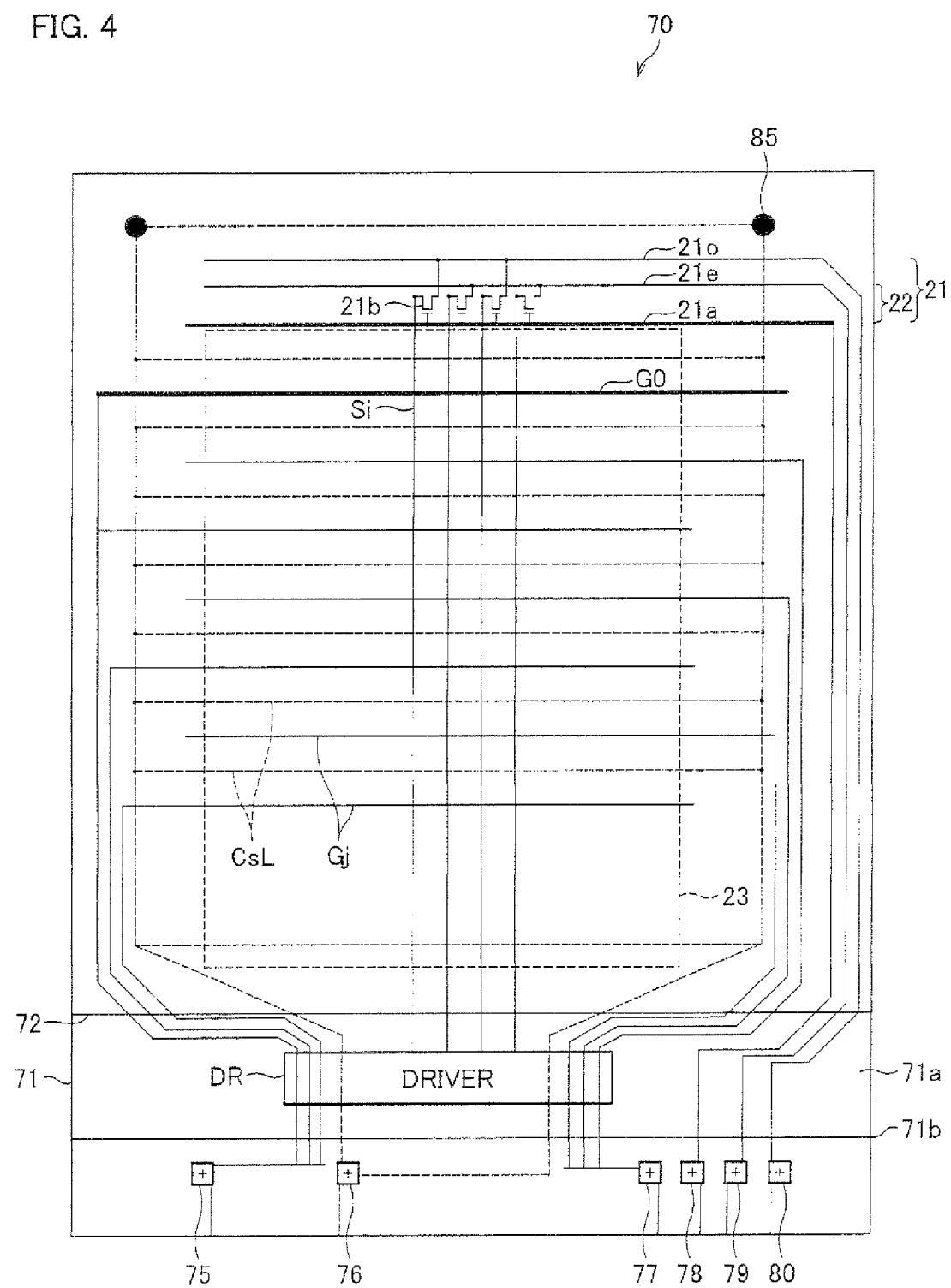
FIG. 4 is a planer view illustrating a configuration of a display panel to which the display panel of FIG. 3 is applied.

FIG. 4 illustrates a configuration of a liquid crystal display panel 70 to which the configuration of FIG. 3 is applied.

The liquid crystal panel 70 is arranged such that an active matrix substrate 71 is combined with a counter substrate 72, and a liquid crystal is injected therebetween.

In a region (equal to an entire region of the counter substrate 72) where the active matrix substrate 71 and the counter substrate overlap each other, a region in a center part surrounded by dash lines in FIG. 4 is an effective display region 23, and the other region is light-shielded by the counter substrate 72.

In the active matrix substrate 71, a blank region 71a that does not overlap the counter substrate 72 is provided outward with respect to an edge side, adjacent to the overlapping region, of the blank region 71a. The blank region 71a includes (i) a region in which a driver DR integrally including a scanning line driver and a data line driver is to be provided, and (ii) a region in which terminals 75 through 80 to which various test signals are supplied in an illumination inspection are to be provided. The region in which the driver DR is to be provided occupies about a half of the blank region 71a that is close to the counter substrate 72. The region in which the terminals 75 through 80 are to be provided occupies the other half of the blank region 71a. A boundary between the region where the driver DR is to be provided and the region where the terminals 75 through 80 are to be provided is a cut off line 71b.

Until an illumination inspection is carried out after the active matrix substrate 71 and the counter substrate 72 are combined with each other, the blank region 71a includes both of the region where the driver DR is to be provided and the region where the terminals 75 through 80 are to be provided. After the illumination inspection is completed, the blank region 71a is cut off at the cut off line 71b such that only the region where the driver DR is to be mounted remains, and the driver DR is mounted thereon. A region that remains after the blank region 71a has been cut off at the cut off line 71b, except for the effective display region 23, is a frame area in a liquid crystal display device (a display device) including the liquid crystal display panel 70.

In the liquid crystal display panel 70, scanning lines Gj of even numbers are provided in the effective display region 23 such that the scanning lines Gj of even numbers are routed from the terminal 75, on the active matrix substrate 71, through a region on a left outside of the effective display region 23 in FIG. 4. Meanwhile, scanning lines Gj of odd numbers are provided in the effective display region 23 such that the scanning lines Gj of odd numbers are routed from the terminal 77, on the active matrix substrate 71, through a region on a right outside of the effective display region 23 in FIG. 4 (in FIG. 4, an uppermost scanning line Gj is temporarily regarded as zeroth). In this case, the lines of the scanning lines Gj thus routed from the terminal 75 and the lines of the scanning lines Gj thus routed from the terminal 77 are respectively provided so as to pass through a part to which a connecting terminal of the driver DR is connected when the driver DR is mounted. This allows the lines of the scanning lines Gj thus routed to be commonly used for an illumination inspection and a normal use, thereby resulting in that a circuit region in the liquid crystal display panel 70 can be reduced by just that much.

Further, a region placed opposite to the blank region 71a such that they sandwich the effective display region 23 includes a test wiring region 21 including a dummy pixel region. In the region, a test data line 21o for data lines Si of odd numbers and a test data line 21e for data lines Si of even numbers are provided as test data lines of the test wiring region 21 (in FIG. 4, a data line Si on a left end is temporarily regarded as first). Test TFTs 21b are provided between the test data lines 21o and a respective of the data lines Si of odd numbers, and between the test data line 21e and a respective of the data lines of even numbers. Gates of the test TFTs 21b are connected to a test switch line 21a.

Moreover, the test switch line 21a, the test data line 21e, and the test data line 21o are routed, on the active matrix substrate 71, through the region on the right outside of the effective display region 23, and respectively connected to the terminals 7S, 79, and 80. When an illumination inspection is carried out, a test switch signal (a signal that causes the test TFTs 1b to switch between ON/OFF) is supplied to the terminal 78, a first data line test signal (a test signal for testing the data lines Si of odd numbers) is supplied to the terminal 79, and a second data line test signal (a test signal for testing the data lines Si of even numbers) is supplied to the terminal 80. Each of the signals is supplied via a probe of a test machine. As such, the test data line 21o for the data lines Si of odd numbers and the test data lines 21e of the data lines Si of even numbers are provided as the test data lines in the test wiring region 21, thereby resulting in that leakage between adjoining data lines Si can be detected.

Further, on the active matrix substrate 71, a wiring line from the terminal 76 is provided so as to surround the effective display region 23, and wiring lines from the surrounding wiring line are provided so as to cross the effective display region 23, parallel to the scanning lines Gj. A common potential is applied to the wiring lines from the terminal 76. The wiring lines that cross the effective display region 23, parallel to the scanning lines Gj, are storage capacitor lines CsL. Further, common transition sections 85, which are illustrated as filled circles, are provided, on the surrounding wiring line, around a region where a test circuit is provided, and the common potential is supplied to a counter electrode of the counter substrate 72 via the common transition sections 85. The line thus routed from the terminal 76 is provided so as to pass through the part on which the driver DR is to be mounted, similarly to the lines routed from the terminals 75 and 77. When the illumination inspection is carried out, the common potential is supplied to the terminal 76 via the probe of the test machine.

In the example of FIG. 4, the driver is provided on only one side of the liquid crystal display panel. However, the arrangement is not limited to this, and drivers can be provided on two or more sides.

Embodiment 3

Further another embodiment of the present invention is explained below with reference to FIGS. 5 and 8.

Figure 5:
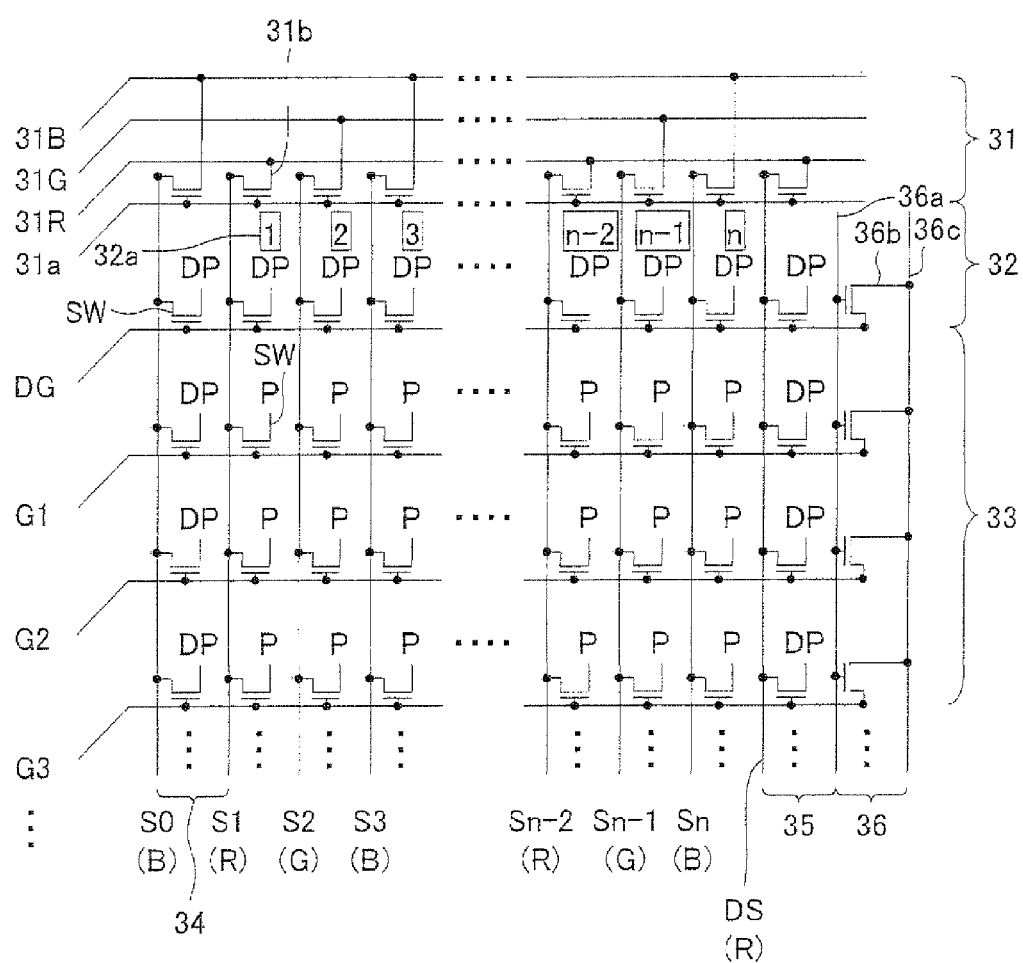
FIG. 5 is a block diagram illustrating a configuration of essential parts of a display panel according to a third embodiment of the present invention.
Figure 6:
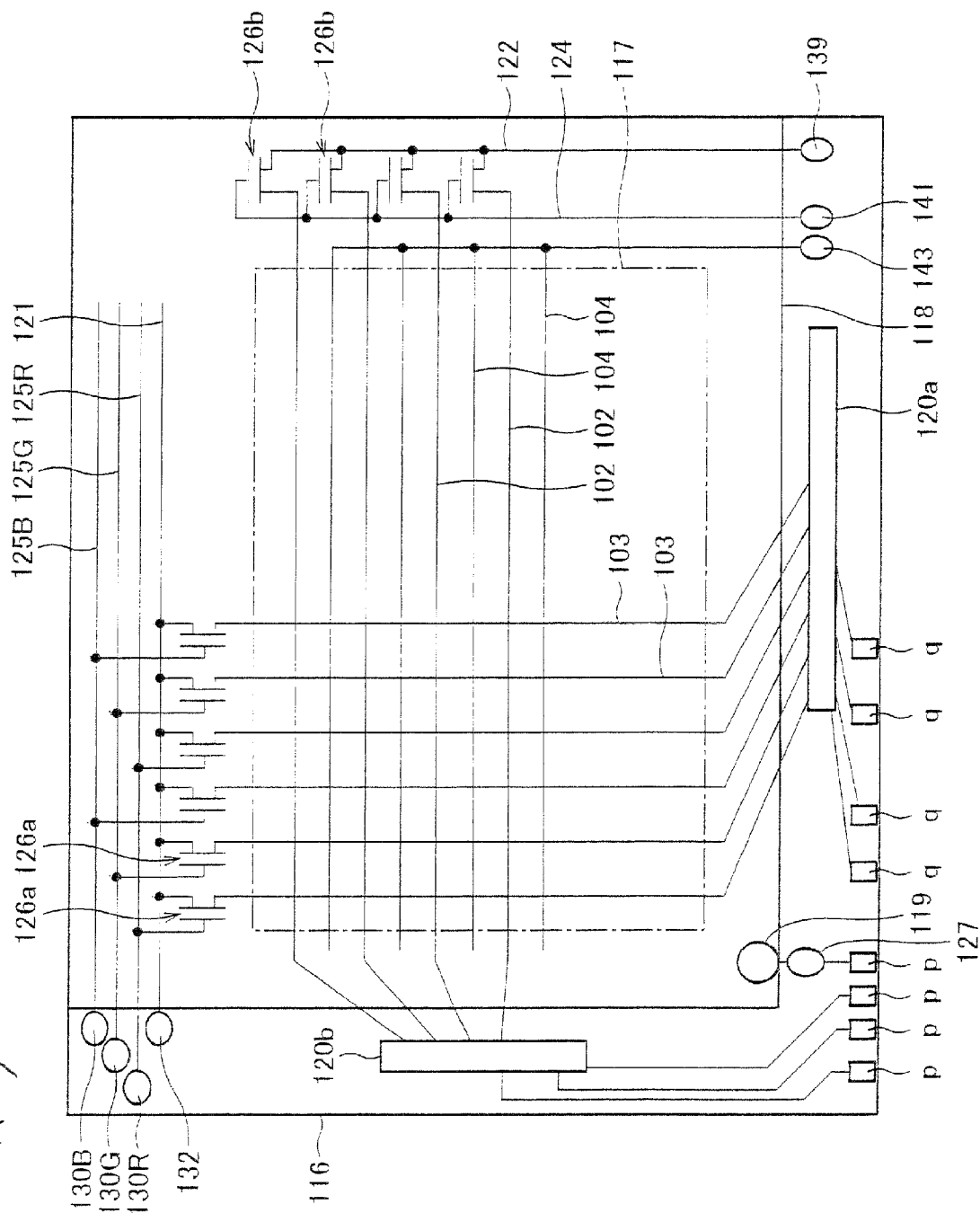
FIG. 6 is a block diagram illustrating a configuration of essential parts of a display panel of a first conventional technology.

FIG. 5 illustrates a circuit configuration around a boundary between a frame area and an effective display region, in an active matrix liquid crystal display panel (a display panel) of the present embodiment.

In the liquid crystal display panel, a test wiring region 31, a dummy pixel region 32, and an effective display region 33 are provided in this order in a direction in which data lines extend. Further, a dummy pixel region 34 is provided on a left of the effective display region 33 and a dummy pixel region 35 is provided on a right thereof, each in a direction in which scanning lines extends. A test wiring region 36 is provided further outside the dummy pixel region 35 in the scanning line direction. The test wiring region 31, the dummy pixel region 2, the dummy pixel region 34, the dummy pixel region 35, and the test wiring region 36 are provided in the frame area and light-shielded by a counter substrate.

The effective display region 33 is usable for providing view images, and arranged such that pixels are respectively provided in regions surrounded by scanning lines Gj (j is an integer) and data lines Si (i is an integer) that are provided perpendicular to each other. An exemplary configuration of the pixels is the same as the one illustrated in FIG. 3. In FIG. 5, for the sake of convenience of illustration, pixel electrodes of the pixels in the effective display region 33 are represented by P, and pixel electrodes of dummy pixels are represented by DP.

In the test wiring region 31, three test data lines (first lines) 31R, 31G, and 31B are provided parallel to the scanning lines Gj, respectively corresponding to R, G, and B colors, a test switch line (a second line) 31a is provided parallel to the test data lines 31R, 31G, and 31B, and test TFTs (switching elements) 31b are provided. A circuit that is constituted by the test data lines 31R, 31G, and 31B, the test switch line 31a, and the test TFTs 31b is a first circuit. The test switch line 31a is singularly placed nearer to the effective display region 33 than the test data lines 31R, 31G, and 31B, and supplies, to the test TFTs 31b, a common control signal for electrical connection and disconnection. The test TFTs 31b are respectively provided for the data lines Si so as to connected to the test data lines 31R, 31G, and 31B such that the test data lines 31R, 31G, and 31B respectively correspond to colors of the data lines Si. The test TFTs 31b control to achieve electrical connection and disconnection between the data lines Si and the test data lines 31R, 31G, and 31B. Gates of the test TFTs 31b are connected to the test switch line 31a.

In the dummy pixel region 32, pixels structurally equivalent to the pixels in the effective display region 33 are provided. The pixels in the dummy pixel region 32 may be provided in a plurality of rows, and gates of TFTs (SW) of pixels provided nearest to the effective display region 33 are connected to a dummy scanning line DG. The dummy scanning line DG is provided so as to have an effect on pixels, in the effective display region 33, which pixels are provided nearest to the dummy pixel region 32, in a similar manner that an adjacent scanning line Gj has a parasitic capacitance effect on other pixels in the effective display region 33. That is, the dummy scanning line DG is provided away from a scanning line G1 by intervals at which the scanning lines Gj are provided in the effective display region 3. From the same viewpoint, whole dummy pixels are provided structurally equivalent to the pixels in the effective display region 33 so that all the pixels in the effective display region 33 are affected by surroundings as equally as possible.

From this reason, it is preferable that a dummy line having a parasitic capacitance effect equivalent to that of the adjacent scanning lines Gj be also provided close to the test wiring region 31, in the dummy pixel region 32. However, in the present embodiment, the test switch line 31a is also used as the dummy line. The test switch line 31a is provided away from the dummy scanning line DG by intervals at which the scanning lines Gj are provided in the effective display region 33. Considering the case where the dummy pixels are provided in a plurality of rows, the test switch lines 31a is provided away from a scanning line of dummy pixels that are provided farthest from the effective display region 33, by intervals at which the scanning lines Gj are provided in the effective display region 33, in a direction away from the effective display region 33. On this account, in the present embodiment, there is no region corresponding to the excess region 202 provided in the conventional liquid crystal display panel illustrated in FIG. 7.

Furthermore, numbering is carried out with respect to the dummy pixel region 32 for forming a pattern 32a indicative of where each line per pixel width along the data lines Si passing through the effective display region 33 is located from an end of the effective display region 33. The pattern 32a is not limited to a number, but can be a character, a mark, or the like provided that the pattern can specify a position. Further, the pattern 2a can be formed, for example, by a gate metal.

The dummy pixel regions 34 and 35 are provided for the same purpose as the dummy pixel region 32, and arranged such that pixels structurally equivalent to the pixels in the effective display region 33 are repeatedly placed in a direction of the scanning lines Si. A dummy data line DS of the dummy pixel region 35 is an adjacent data line that causes a parasitic capacitance effect on pixels placed in a right edge column in the effective display region 33. A test switch line (a second line) 36a is provided in the test wiring region 36 as an adjacent data line that causes a parasitic capacitance effect on pixels in the dummy pixel region 35. In addition to this, test TFTs (switching elements) 36b and a test scanning line (a first line) 36c are provided in the test wiring region 36. A circuit that is constituted by the test scanning line 36c, the test switch line 36a, and the test TFTs 36b is another first circuit.

The test TFTs 36b are respectively provided for the scanning lines Gj and the dummy scanning line DG so as to connected to the test scanning line 36c, and control to achieve electrical connection and disconnection between (i) the test scanning line 36c and (ii) the scanning lines Gj and the dummy scanning line DG, respectively. Gates of the test TFTs 36b are connected to the test switch line 36a, and a signal supplied to the test switch line 36a controls the test TFTs 36b to switch between ON/OFF.

The test switch line 36a is singularly provided, and supplies, to the test TFTs 36b, a common control signal for electrical connection and disconnection. Considering a case where dummy pixels in the dummy pixel region 35 are provided in a plurality of columns, the test switch line 36a is provided away from a data line of dummy pixels in the dummy pixel region 35 that are provided farthest from the effective display region 33, by intervals at which the data lines Si are provided in the effective display region 33, in a direction away from the effective display region 33.

In the liquid crystal display panel in FIG. 5, when an illumination inspection is carried out, all the test TFTs 36b are caused to be in an ON state by the test switch line 36a, and selection voltages are applied to all the scanning lines Gj and the dummy scanning line DG from the test scanning line 36c via the test TFTs 36b so that the pixels in the effective display region 33 and the dummy pixels are entirely caused to be in a selection state. Then, all the test TFTs 31b are caused to be in an ON state by the test switch line 31a, and signals respectively supplied to the test data lines 31R, 31G, and 31B are written to a respective of the pixels via the data lines Si. At this moment, if a selection voltage applied to the test switch line 31a is equivalent to the selection voltage applied to the scanning lines Gj, a parasitic capacitance effect caused by the test switch line 31a with respect to the dummy pixels can be close to a parasitic capacitance effect caused by an adjacent scanning line Gj with respect to pixels in the effective display region 33.

Further, when the liquid crystal display panel is being normally used, a voltage that causes the test TFTs 31b to be in an OFF state is applied to the test switch line 31a. If the voltage is equivalent to a non selection voltage that is applied to the scanning lines Gj, a parasitic capacitance effect caused by the test switch line 31a with respect to the dummy pixels can be closed to a parasitic capacitance effect caused by an adjacent scanning line Gj with respect to pixels in the effective display region 3.

The dummy pixels in normal use may be driven by a signal supplied to the dummy scanning line DG, which signal is supplied independently from a signal supplied to the scanning lines Gj, or may be driven in such a manner that the dummy scanning line DG is provided as a target to be sequentially scanned as well as the scanning lines Gj. Further, the dummy scanning line DG can be floating.

As such, in the present embodiment, the test switch line 31a is also used as a dummy line corresponding to an adjacent scanning line and causes a parasitic capacitance effect on the dummy pixels, thereby eliminating an excess region that is conventionally provided in a frame area, with the result that the frame area can be reduced in a direction of the data lines Si. For example, in a liquid crystal display panel such as a QVGA panel for a mobile device, it is possible to attain a largely reduced width such that a width of approximately one dot or one line is 150 μm to 200 μm in the direction of the data lines Si.

In a case where the dummy pixels are repeatedly provided in a scanning line direction and a test circuit that is to be connected to the scanning lines Gj is provided in a region adjacent to the effective display region in a direction of the scanning lines Gj, a region corresponding to an excess region is not required to be provided, similarly to the case in the data line direction, thereby resulting in that a reduction in the frame area, similar to that in the data line direction, can be attained. If needed, the numbering similar to the pattern 32a may be carried out with respect to the dummy pixel region 35.

In a case where dummy pixels are provided in a plurality of rows in the dummy pixel region 32, the test switch line 31a is also used as a dummy line of dummy pixels provided in a row nearest to the test wiring region 31, so as to correspond to an adjacent scanning line. In a case where dummy pixels are provided in a plurality of columns in the dummy pixel region 35, the test switch line 36a is also used as a dummy line of dummy pixels in a column nearest to the test wiring region 36, so as to correspond to an adjacent data line. Further, in the example, three test data lines are provided so that the three test lines respectively correspond to R, G, and B colors. However, the number of the test data lines is not limited to this, and an arbitrary number of the test data lines may be provided.

The embodiments have been respectively described as above. Needless to say, the display panels of the embodiments can be made up as various display devices such that a bezel and the like are attached to the display panels in accordance with a normal fabrication process.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

INDUSTRIAL APPLICABILITY

The present invention can be preferably used especially in a mobile device including a liquid crystal display panel, and further, can be used in a TV including a liquid crystal display panel.

The invention claimed is:

1. An active matrix display panel comprising:
a first circuit provided outside an effective display region that is usable for providing view images, the first circuit including:
at least one first line via each of which a predetermined signal is supplied to a corresponding data line;
switching elements, respectively provided for data lines, which achieve electrical connection and disconnection between the data lines and said at least one first line; and
a single second line, provided parallel to scanning lines, via which a common control signal for the electrical connection and disconnection is supplied to the switching elements, and
said active matrix display panel further comprising:
dummy pixels which are structurally equivalent to pixels provided in the effective display region, and which are provided so as to be outside the effective display region and so as to be closer to the second line,
the second line being provided away from a scanning line of dummy pixels that are provided farthest from the effective display region, by intervals at which the scanning lines are provided in the effective display region, in a direction away from the effective display region,
wherein the second line is provided so that pixel electrodes of the dummy pixels are provided between the second line and the scanning line of the dummy pixels that are provided farthest from the effective display region,
wherein the second line is provided so that a parasitic capacitance of the second line with respect to the dummy pixels adjacent to the second line is equivalent to a parasitic capacitance of an adjacent scanning line with respect to the pixels provided in the effective display region.

2. The display panel as set forth in claim 1, further comprising:
a secondary first circuit outside the effective display region that is usable for providing view images, the secondary first circuit including:
at least one secondary first line via each of which a predetermined signal is supplied to a corresponding scanning line;
second switching elements, respectively provided for scanning lines, which achieve electrical connection and disconnection between the scanning lines and said at least one secondary first line; and
a single secondary second line, provided parallel to data lines, via which a common control signal for the electrical connection and disconnection is supplied to the second switching elements, and
said active matrix display panel further comprising:
second dummy pixels which are structurally equivalent to pixels provided in the effective display region, and which are provided so as to be outside the effective display region and so as to be closer to the secondary second line,
the secondary second line being provided away from a data line of second dummy pixels that are provided farthest from the effective display region, by intervals at which the data lines are provided in the effective display region, in a direction away from the effective display region.

3. The display panel as set forth in claim 2, wherein: while the display panel is being normally used, (i) a voltage that causes the switching elements to be off is applied to the second line, and (ii) a voltage that causes the second switching elements to be off is applied to the secondary second line.

4. The display panel as set forth in claim 2, wherein:
a display driver is provided in a part of a frame area in which part neither the first circuit nor the secondary first circuit is provided, the frame area being provided outside the effective display region.

5. The display panel as set forth in claim 1, wherein: a pattern indicative of a position in the display panel is formed in a region where the dummy pixels are provided.

6. The display panel as set forth in claim 1, wherein: a voltage, applied to the second line, which causes the switching elements to be on is equivalent to a selection voltage that is applied to the scanning lines in the effective display region.

7. The display device as set forth in claim 1, wherein: while the switching elements are caused to be on, an illumination inspection is carried out such that the predetermined signal is supplied to the corresponding data line via each of said at least one first line.

8. The display panel as set forth in claim 1, wherein: while the display panel is being normally used, a voltage that causes the switching elements to be off is applied to the second line.

9. The display panel as set forth in claim 1, wherein:
while the display panel is being normally used, a voltage, applied to the second line, which causes the switching elements to be off is equivalent to a non selection voltage that is applied to the scanning lines in the effective display region.

10. The display panel as set forth in claim 1, wherein:
a display driver is provided in a part of a frame area in which part the first circuit is not provided, the frame area being provided outside the effective display region.

11. The display panel as set forth in claim 1, wherein the display panel is a liquid crystal display panel.

12. A display device comprising a display panel as set forth in claim 1.

13. An active matrix display panel comprising:
a first circuit outside an effective display region that is usable for providing view images, the first circuit including:
at least one first line via each of which a predetermined signal is supplied to a corresponding data line;
switching elements, respectively provided for data lines, which achieve electrical connection and disconnection between the data lines and said at least one first line; and
a single second line, provided parallel to scanning lines, via which a common control signal for the electrical connection and disconnection is supplied to the switching elements, and
said active matrix display panel further comprising:
dummy pixels which are structurally equivalent to pixels provided in the effective display region, and which are provided so as to be outside the effective display region, and so as to be closer to the second line,
the second line being also used as a scanning line of dummy pixels that are provided farthest from the effective display region,
the switching elements being also used as active elements that achieve electrical connection and disconnection between the scanning line of the dummy pixels that are provided farthest from the effective display region and the data lines,
wherein the second line is provided so that a parasitic capacitance of the second line with respect to the dummy pixels adjacent to the second line is equivalent to a parasitic capacitance of an adjacent scanning line with respect to the pixels provided in the effective display region.

14. The active matrix display panel of claim 13, wherein the second line is provided between (i) pixel electrodes of the dummy pixels that are provided farthest from the effective display region, and (ii) pixel electrodes of pixels other than the dummy pixels that are provided farthest from the effective display region.

15. An active matrix display panel comprising:
a first circuit outside an effective display region that is usable for providing view images, the first circuit including:
at least one first line via each of which a predetermined signal is supplied to a corresponding scanning line;
switching elements, respectively provided for the scanning lines, which achieve electrical connection and disconnection between the scanning lines and said at least one first line; and
a single second line, provided parallel to data lines, via which a common control signal for the electrical connection and disconnection is supplied to the switching elements, and
said active matrix display panel further comprising:
dummy pixels which are structurally equivalent to pixels provided in the effective display region, and which are provided so as to be outside the effective display region and so as to be closer to the second line,
the second line being provided away from a data line of dummy pixels that are provided farthest from the effective display region, by intervals at which the data lines are provided in the effective display region, in a direction away from the effective display region,
wherein the second line is provided so that a parasitic capacitance of the second line with respect to the dummy pixels adjacent to the second line is equivalent to a parasitic capacitance of an adjacent data line with respect to the pixels provided in the effective display region.

16. An active matrix display panel comprising:
a first circuit provided outside an effective display region that is usable for providing view images, the first circuit including:
at least one first line via each of which a predetermined signal is supplied to a corresponding data line;
switching elements, respectively provided for data lines, which achieve electrical connection and disconnection between the data lines and said at least one first line; and
a single second line, provided parallel to scanning lines, via which a common control signal for the electrical connection and disconnection is supplied to the switching elements, and
said active matrix display panel further comprising:
first dummy pixels which are structurally equivalent to pixels provided in the effective display region, and which are provided so as to be outside the effective display region and so as to be closer to the second line,
the second line being provided away from a scanning line of first dummy pixels that are provided farthest from the effective display region, by intervals at which the scanning lines are provided in the effective display region, in a direction away from the effective display region,
wherein the second line is provided so that pixel electrodes of the first dummy pixels are provided between the second line and the scanning line of the first dummy pixels that are provided farthest from the effective display region,
a secondary first circuit outside the effective display region that is usable for providing view images, the secondary first circuit including: at least one secondary first line via each of which a predetermined signal is supplied to a corresponding scanning line; second switching elements, respectively provided for scanning lines, which achieve electrical connection and disconnection between the scanning lines and said at least one secondary first line; and a single secondary second line, provided parallel to data lines, via which a common control signal for the electrical connection and disconnection is supplied to the second switching elements,
second dummy pixels which are structurally equivalent to pixels provided in the effective display region, and which are provided so as to be outside the effective display region and so as to be closer to the secondary second line, the secondary second line being provided away from a data line of second dummy pixels that are provided farthest from the effective display region, by intervals at which the data lines are provided in the effective display region, in a direction away from the effective display region, and wherein said second dummy pixels are provided in a column that is (i) parallel to the data lines and the single secondary second line, and (ii) perpendicular to a row in which said first dummy pixels are provided.

* * * * *